United States Patent [19]

Miyashita et al.

[11] Patent Number: 5,656,809
[45] Date of Patent: Aug. 12, 1997

[54] ATOMIC FORCE MICROSCOPE AND MEASURING HEAD THEREOF WITH LINEARLY POLARIZED REFLECTED LIGHT

[75] Inventors: Norihisa Miyashita; Tadashi Nishioka, both of Hyogo, Japan

[73] Assignees: Mitsubishi Denki Kabushiki Kaisha, Tokyo; Ryoden Semiconductor System Engineering Corporation, Itami, both of Japan

[21] Appl. No.: 587,528

[22] Filed: Jan. 17, 1996

[30] Foreign Application Priority Data

Aug. 23, 1995 [JP] Japan ................................ 7-214757

[51] Int. Cl.$^6$ ........................................................ G02F 1/01
[52] U.S. Cl. ...................... 250/225; 250/559.22; 250/307
[58] Field of Search .......................... 250/225, 559.09, 250/559.22, 559.34, 559.4, 559.44, 306, 307, 234; 356/375, 376, 369, 368, 305

[56] References Cited

U.S. PATENT DOCUMENTS

| | | | |
|---|---|---|---|
| 5,185,644 | 2/1993 | Shimoyama et al. | 250/225 |
| 5,231,286 | 7/1993 | Kajimura et al. | 250/234 |
| 5,298,975 | 3/1994 | Khoury et al. | 250/306 |

FOREIGN PATENT DOCUMENTS

| | | |
|---|---|---|
| 0 438 675 | 7/1991 | European Pat. Off. . |
| 0 551 814 | 7/1993 | European Pat. Off. . |
| 0 633 450 | 1/1995 | European Pat. Off. . |

OTHER PUBLICATIONS

Appl. Phys. Lett., vol. 53, No. 12, pp. 1045–1047, Sep. 19, 1988, Gerhard Meyer, et al., "Novel Optical Approach to Atomic Force Microscopy".

Science, vol. 243, pp. 1586–1589, Mar. 24, 1989, B. Drake, et al., "Imaging Crystals, Polymers, and Processes in Water With the Atomic Force Microscope".

Appl. Phys. Lett., vol. 55, No. 24, pp. 2491–2493, Dec. 11, 1989, S.A. Chalmers, et al., "Determination of Tilted Superlattice Structure By Atomic Force Microscopy".

Appl. Phys. Lett., vol. 56, No. 21, pp. 2100–2101, May 21, 1990, Gerhard Meyer, et al., "Optical-Beam-Deflection Atomic Force Microscopy: The NACL (001) Surface".

J. Vac. Sci. Technol., vol. A8, No. 1, pp. 400–402, Jan./Feb. 1990., R.C. Barrett, et al., "Imaging Polished Sapphire With Atomic Force Microscopy".

Proc. IEEE, IRPS, pp. 299–303, Jan. 1992, Gabi Neubauer, et al., "Imaging VLSI Cross Sections by Atomic Force Microscopy".

Science, vol. 257, pp. 1900–1905, Sep. 25, 1992, M. Radmacher, et al., "From Molecules to Cells: Imaging Soft Samples With the Atomic Force Microscope".

J. Appl. Phys., vol. 76, No. 2, pp. 796–799, Jul. 15, 1994, P. K. Hansma, et al., "A New, Optical-Lever Based Atomic Force Microscope".

(List continued on next page.)

*Primary Examiner*—Que Le
*Attorney, Agent, or Firm*—Oblon, Spivak, McClelland, Maier & Neustadt, P.C.

[57] ABSTRACT

It is an object to realize a measuring head capable of maintaining high Z direction accuracy even with a measured sample having fine, complicated and very uneven pattern configuration, in an atomic force microscope. A light beam (141) of non-linear polarization is incident upon an end portion (110a) of an upper main surface of a cantilever body (110) having a probe (2). The cantilever body (110) is a polarizing plate, and its refractive index is given by tan (a Brewster's angle of the light beam (141)). Accordingly, a reflected light beam (142) reflected at the end portion (110a) becomes light of linear polarization. A light position detector (150) including an analyzing window (150a) including a polaroid thin film as an analyzing material transmits only the light oscillating in the same direction as the electric vector of the linearly polarized reflected light beam (142) to detect its positional change. A control signal (V3) for driving a piezo element (6) is generated on the basis of a value of its output signal (V1) and a measured sample (3) is scanned in the XYZ directions.

20 Claims, 14 Drawing Sheets

OTHER PUBLICATIONS

Appl. Phys. Lett., vol. 64, No. 12, pp. 1493–1495, Mar. 21, 1994, U. Rabe, et al., "Acoustic Microscopy by Atomic Force Microscopy".

Patent Abstracts of Japan, vol. 015, No. 335 (P–1242), Aug. 26, 1991, JP–A–03–123805, May 27, 1991.

Patent Abstracts of Japan, vol. 95, No. 03, Apr. 28, 1995, JP–A–06–337261, Dec. 6, 1994.

F I G. 4
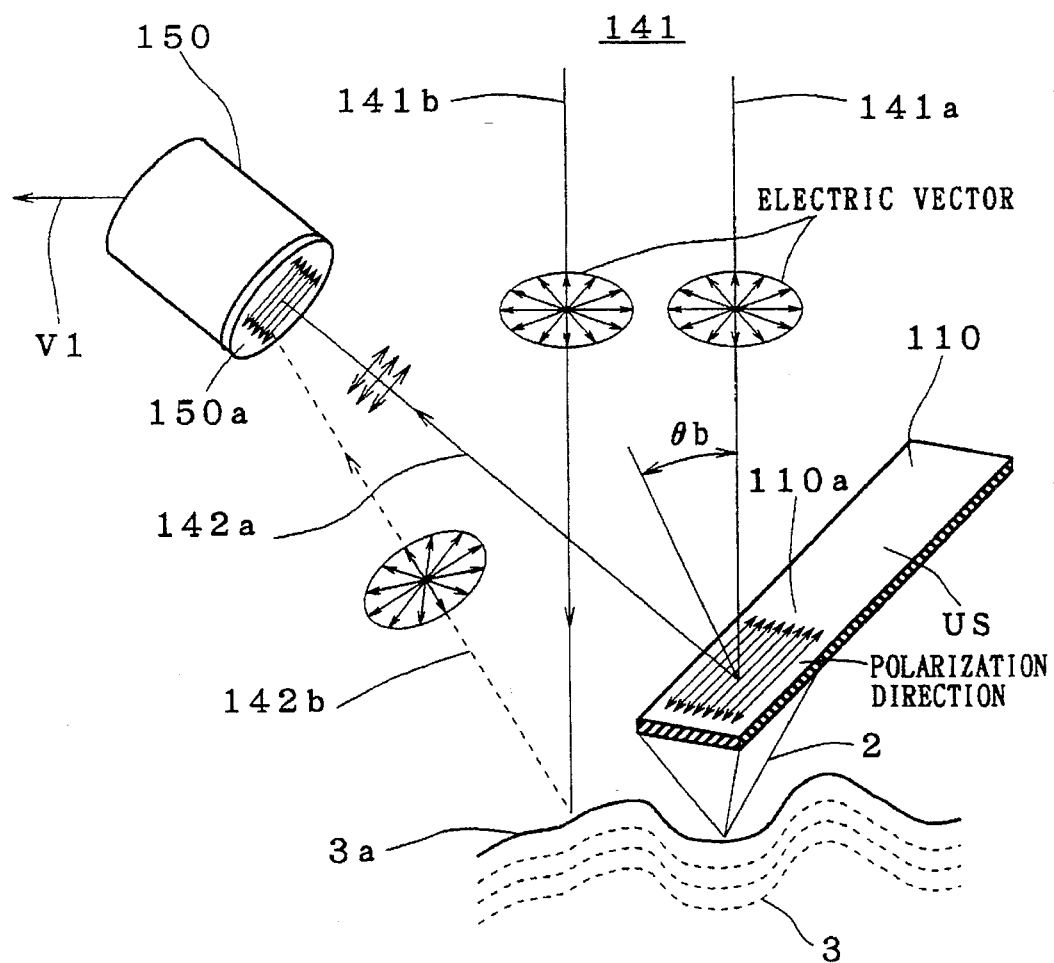

ATOMIC FORCE MICROSCOPE AND MEASURING HEAD THEREOF WITH LINEARLY POLARIZED REFLECTED LIGHT

BACKGROUND OF THE INVENTION

1. Field of the Invention

The present invention relates to measuring heads of an atomic force microscope AFM, and particularly to a measuring head of an atomic force microscope by the light beam lever system.

2. Description of the Background Art

A measuring head of an atomic force microscope includes as its basic components a light source for generating a light beam, a cantilever for reflecting the light beam and a light position detector for detecting "deflection" (displacement) of the cantilever according to positional change of the light beam reflected by the cantilever. References shown below disclose structures of such a measuring head of an atomic force microscope by the light beam lever system.

(1) Gehard Meyer and Nabil H. Amer: Appl. Phys. Lett., Vol. 53, No. 12 (1988), pp. 1045–1047.

(2) B. Brake, C. B. Prater, A. L. Weisenhorn, S. A. C. Gould, T. R. Albrecht, C. F. Quate, D. S. Cannell, H. G. Hansma, and P. K. Hansma: Science, Vol. 243 (1989), pp. 1586–1589.

(3) S. A. Chalmers, A. C. Gossard, A. L. Weisenhoru, S. A. C. Gould, B. Drake, and P. K. Hansma: Appl. Phys. Lett., Vol. 55, No. 24 (1989), pp. 2491–2493.

(4) Gehard Meyer and Nabil M. Amer: Appl. Phys. Lett., Vol. 56, No. 21 (1990), pp. 2100–2101.

(5) R. C. Barrett and C. F. Quate: J. Vac. Sci. Technol. A, Vol. 8, No. 1 (1990), pp. 400–402.

(6) Gabi NeuBauer, M. Lawrence A. Dass, and Thad Jhonson: Proc. of IEEE Intern. Rel. Phys. Sympo., (1992) pp. 299–303.

(7) M. Radmacher, R. W. Tillmnann, M. Fritz, H. E. Gaub: Science, Vol. 257 (1992), pp. 1900–1905.

(8) P. K. Hansma, B. Drake, D. Grigg, C. B. Prater, F. Yashar, G. Gurley, V. Elings, S. Feinstein, and R. Lal: *J. Appl. Phys.*, Vol. 76, No. 2 (1994), pp. 796–799.

(9) U. Rabe and W. Armold: Appl. Phys. Lett., Vol. 64, No. 12 (1994), pp. 1493–1495.

(10) Japanese Patent Laying-Open No. 2-281103.

(11) Japanese Patent Laying-Open No. 4-285810.

(12) Japanese Patent Laying-Open No. 7-5181.

FIG. 12 shows a structure diagram of a conventional measuring head of an atomic force microscope disclosed in each of the above references (1) through (8). FIG. 13 shows one disclosed in the reference (9), which shows a structure of a conventional measuring head to which a mirror 51P for changing the optical path direction is added. FIG. 12 shows a control portion 10P for operating the measuring head 100P, too, which shows the entire system as an atomic force microscope 20P.

A light beam 41 emitted from a light source 4 is converged onto the upper surface of a cantilever body 1, and a reflected light 42 thereof is incident upon a light position detector 5. This light position detector 5 includes a two-segment or four-segment photodiode, which detects positional shift of the reflected light 42 from the cantilever body 1 to sense fine "deflection" of the cantilever body 1 caused by the atomic force occurred between a probe 2 provided at the end of the cantilever body 1 and a measured sample 3. The light source 4 emits a light beam 41 which is not linearly polarized, the cantilever body 1 is composed of a material such as silicon (Si) or silicon nitride ($Si_3N_4$), etc., the probe 2 is composed of silicon (Si) or diamond, etc. having a sharp tip, and the light position detector 5 simply detects the positional change of the incident light.

The operation for measuring an image of unevenness on the surface of the measured sample 3 by using this atomic force microscope 20P will be described below.

First, a controller 7P of the control portion 10P receives an instruction from a computer 8P and applies a voltage to a Z electrode of a cylindrical piezo element 6 to move the measured sample 3 in the Z direction (up and down direction) with feedback control so that the reflected light 42 from the cantilever body 1 is incident on a certain position on the light position detector 5, i.e., on a position displaced by a certain amount from a position where an output of the light position detector 5 attains just 0. Then, this way, while the cylindrical piezo element 6 is operated with feedback in the Z direction, a voltage is further applied to an XY electrode of the piezo element 6 from the computer 8P through the controller 7P to simultaneously scan the measured sample 3 in the XY directions, too. At this time, by reading each voltage in the XYZ directions applied to the cylindrical piezo element 6 from the controller 7P, an image of the unevenness on the surface of the measured sample 3 is obtained.

However, the conventional measuring head disclosed in the references cited above generally have such problems as below.

Now, FIG. 14 and FIG. 15 are a side view of the measuring head 100P and a transverse cross section seen from the incident side of the light beam 41 illuminating the vicinity of the end portion of the cantilever body 1, respectively, which are shown to illustrate problems of the conventional measuring head of the atomic force microscope.

First, when the conventional measuring head 100P is applied to the measured sample 3 having a considerably uneven surface 3a as shown in FIG. 14, the measurement accuracy in the Z direction (up and down direction) is considerably decreased. This is described in detail below.

Generally, in the atomic force microscope, the thickness and the width (w) of the cantilever body 1 (refer to FIG. 15) are set small so that even fine atomic force can cause large "deflection" of the cantilever body, accordingly, to reduce a spring constant thereof. On the other hand, the light beam 41 having a sectional dimension or a beam diameter (D) larger than the width (w) of the cantilever body 1 is used so that a large output signal is obtained in the light position detector 5, and further, so that the light beam 41 can be certainly incident on the cantilever body 1 and the illumination thereof can be visually recognized. Accordingly, as schematically shown in FIG. 15, the sectional dimension (D) of the light beam 41 is larger than the dimension of the cantilever body 1, e.g., then the width (w), and then the incident light beam 41 includes not only a necessary light 41a actually required to obtain measured values in the Z direction but also an unnecessary light off the frame of the end portion, i.e., an extra light 41b which will cause measurement errors. Accordingly, not only a regularly reflected light 42a originated from the necessary light 41a, but also an irregularly reflected light 42b produced by irregular reflection of the extra light 41b off the cantilever body 1 on the surface 3a of the measured sample 3 is incident upon the light position detector 5, depending on the interval between the cantilever body 1 and the surface 3a of the measured sample 3 and the unevenness on the surface 3a, resulting in a decrease of the measurement accuracy in the Z direction mentioned above.

As a result, correct measurement in the Z direction with the regularly reflected light 42a can not be made, causing the problem of confusing the feedback control mentioned above. Especially, when one of the regularly reflected light 42a and the irregularly reflected light 42b causes the output of the light position detector 5 on the plus side and the other causes the output on the minus side, the output fluctuating according to the intensity of light all the time may disable the control. This way, in the conventional measuring head 100P, the light beam 41 is reflected also on the surface 3a of the sample and the irregularly reflected light 42b not from the cantilever body 1 strays into the light position detector 5. Accordingly, for example, the atomic force microscope using the conventional measuring head 100P could not accurately observe and measure the surface of the measured sample 3 having fine, complicated and extremely uneven pattern configuration, such as a semiconductor chip surface etc. The problem of the conventional measuring head 100P has arisen because the irregularly reflected light resulted from the extra light 41b was not recognized and no measures have been taken thereto, as mentioned above, which will be exemplified by the force curve shown in FIG. 5 later.

Now, it may be supposed that the above-described problem can be solved by converging the light beam from the light source with a lens to narrow down the beam. Considering it from the user side, however, it is difficult to satisfy the resolution above, and which will be an impractical method. In the atomic force microscope, a structure is desired in which the beam diameter of the light beam is large enough so that it can be visually recognized that the light beam is certainly radiated onto the end of the cantilever body. Under such a realistic demand, a measure is earnestly required to solve the problem of the irregular reflection light.

SUMMARY OF THE INVENTION

According to a first aspect of the present invention, a measuring head of an atomic force microscope comprises a light source for generating a light beam of non-linear polarization, cantilever means comprising a cantilever body having a probe on its lower main surface facing to a measured sample, for reflecting part of the light beam incident from the light source at an end portion on an upper main surface of the cantilever body which is above the position where the probe is provided and having a polarizing function of changing polarization of the light beam into linear polarization at that time and light position detecting means for detecting a positional change only of a reflected light beam of the linear polarization.

According to another aspect of the present invention, an atomic force microscope comprises a measuring head, a measured sample, and a control portion for controlling the measuring head, the measuring head comprising driving means for three-dimensionally scanning the measured sample, a light source for generating a light beam of non-linear polarization, cantilever means having a probe formed on its lower main surface end portion for sensing unevenness on a surface of the measured sample, for reflecting part of the light beam at an upper main surface end portion facing to the lower main surface end portion and having a polarizing function of changing polarization of the reflected light beam into linear polarization, and light position detecting means for detecting a positional change only of the linearly polarized reflected light beam, wherein the control portion outputs a control signal for controlling the driving means according to an output signal of the light position detecting means, and the driving means scans the measured sample according to the control signal.

In this invention, only the reflected light beam from the cantilever means, i.e., the linearly polarized reflected beam only is detected by the light position detecting means. That is to say, an irregularly reflected light produced from the other part of the light beam emitted from the light source, or the extra light, irregularly reflected on the surface of the measured sample is not detected, and the regularly reflected light produced from necessary light as a part of the light beam only is detected. As a result, truly correct Z direction measurement and perfect feedback control can be performed.

The present invention has been made to solve such problems as described above, and it is a main object of the present invention to provide an atomic force microscope and its measuring head with new structure which is capable of facilitating radiation of a light beam to a cantilever body, performing sure and stable feedback control and maintaining high accuracy in the Z direction even with a measured sample having fine, complicated and very uneven pattern configuration.

It is another object of the present invention to provide a structure of a measuring head which can solve the problems by utilizing a cantilever body with conventional structure.

It is still another object of the present invention to certainly select the light of the linear polarization adopted in this invention to further increase its accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an enlarged perspective view of the main portion of the measuring head for illustrating the effects of the measuring head of FIG. 1.

DESCRIPTION OF THE PREFERRED EMBODIMENTS

Measuring heads for AFM in the respective preferred embodiments described below mainly include a light source generating a light beam which is not linearly polarized, "cantilever means" for reflecting part of the light beam from the light source which is incident on the tip of a cantilever body and for having a polarizing function so that the reflected light beam becomes a linearly polarized light beam, and "light position detecting means" for detecting a positional change only of the reflection light beam which is linearly polarized by the cantilever means.

Now, details of the preferred embodiments of the present invention will be described referring to the accompanying drawings.

(First Preferred Embodiment)

Figure 1:
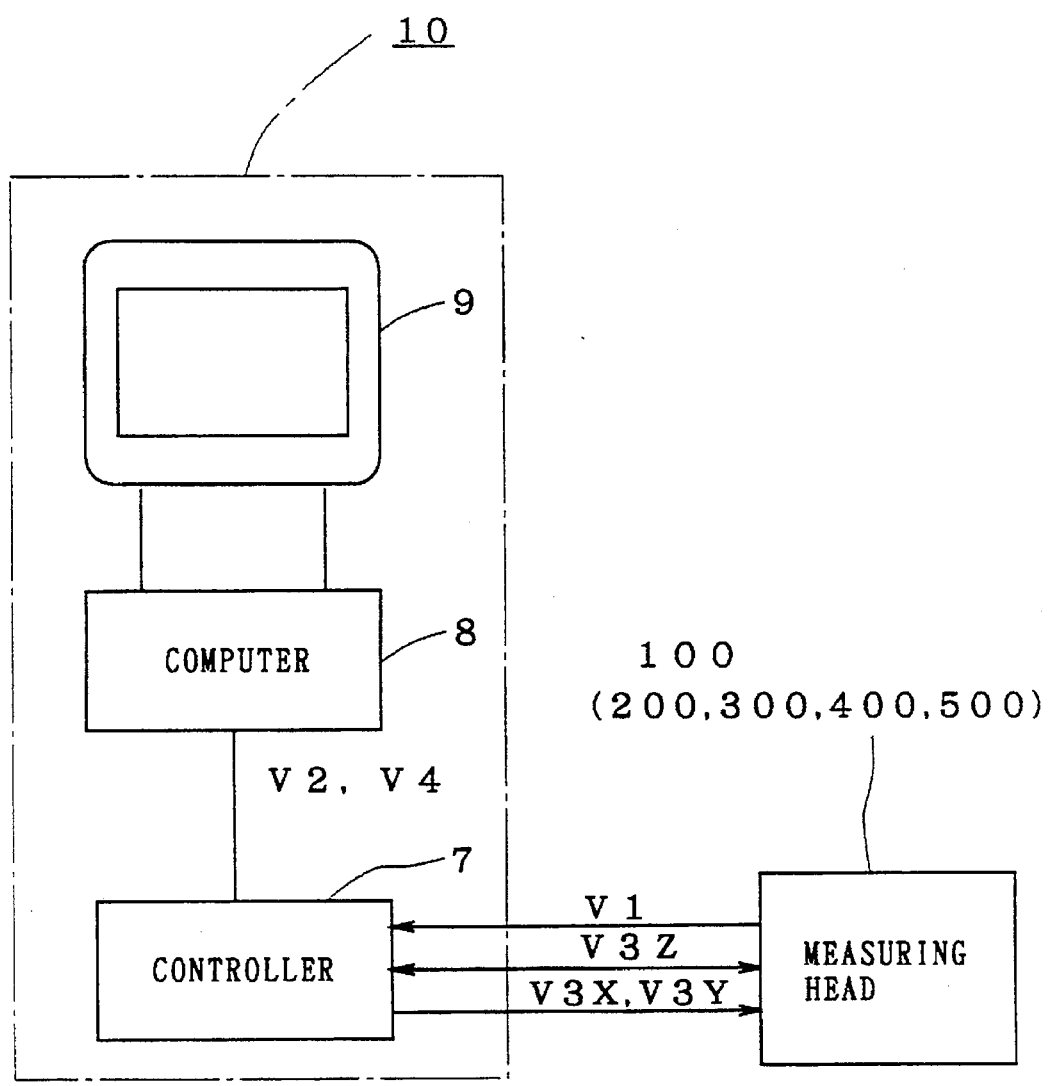
FIG. 1 is a block diagram showing an example of the entire structure of an atomic force microscope according to the present invention.

FIG. 1 is a block diagram showing the entire structure of an atomic force microscope 20. This microscope 20 can be roughly divided into a measuring head 100 and a control portion 10. The structure of the measuring head 100 is the core of the present invention, and other second through fifth preferred embodiments are also related to improvements of the measuring heads 200, 300, 400, 500. Accordingly, the structure shown in FIG. 1 is common in all the preferred embodiments.

The control portion 10 includes a CRT display 9 and a controller 7 around a computer (CPU) 8. The controller 7 receives an instruction signal V2 from the computer 8 to operate, and receives an output signal V1 outputted from the measuring head 100 (corresponding to an output voltage of a light position detector described later) to output control signals V3X, V3Y, V3Z related to the X, Y, Z directions according to the value thereof. These control signals V3X–V3Z are for controlling a piezo element which serves as a driving portion in the measuring head 100, and the piezo element three-dimensionally scans a measured sample in accordance with the control signals V3X–V3Z.

The computer 8 receives the control signals V3X–V3Z as a signal V4, on the basis of which it calculates an image of the surface unevenness of the measured sample and displays the image on the CRT display 9.

Figure 2:
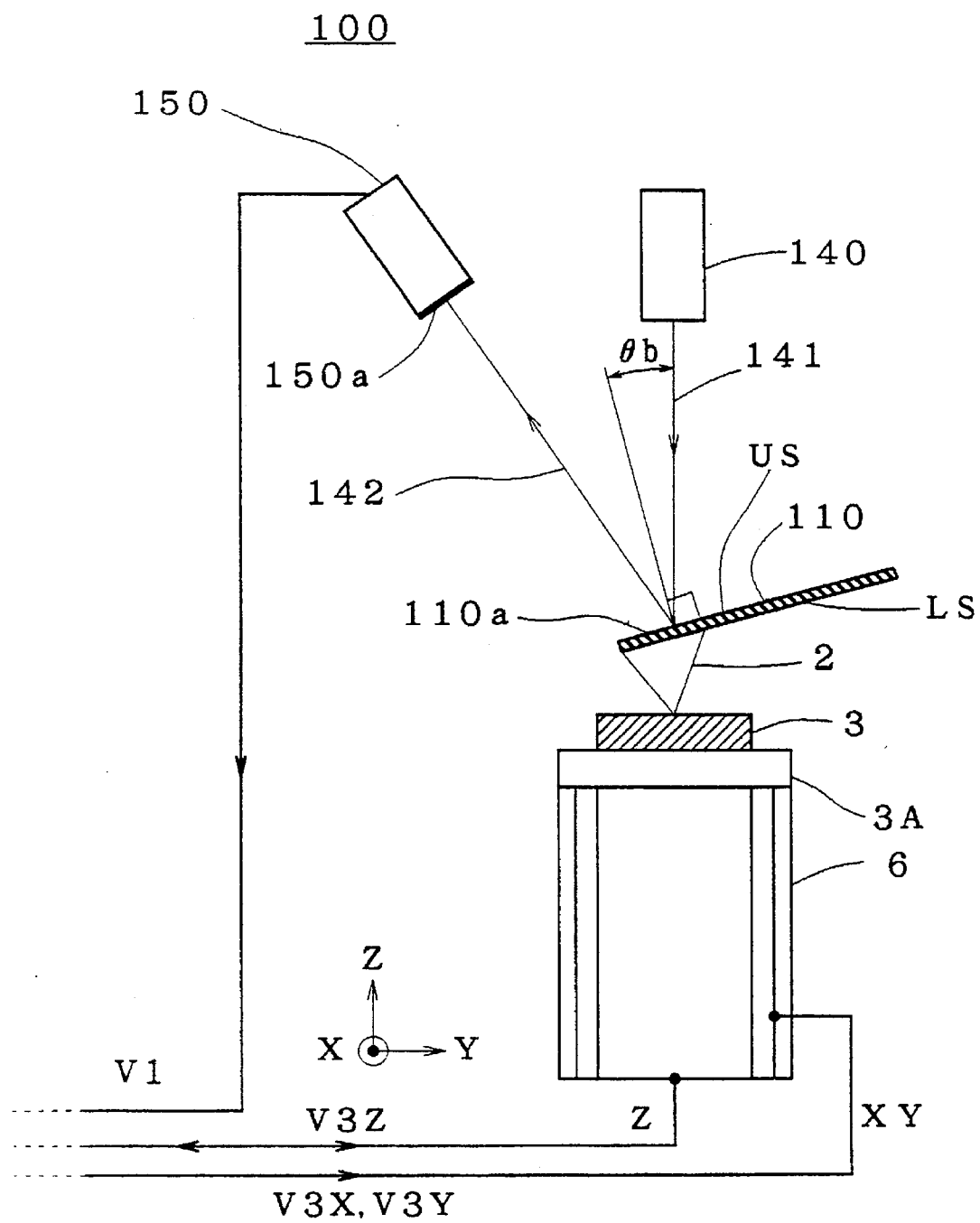
FIG. 2 is a side view showing the structure of a measuring head in a first preferred embodiment of the present invention.
Figure 3:
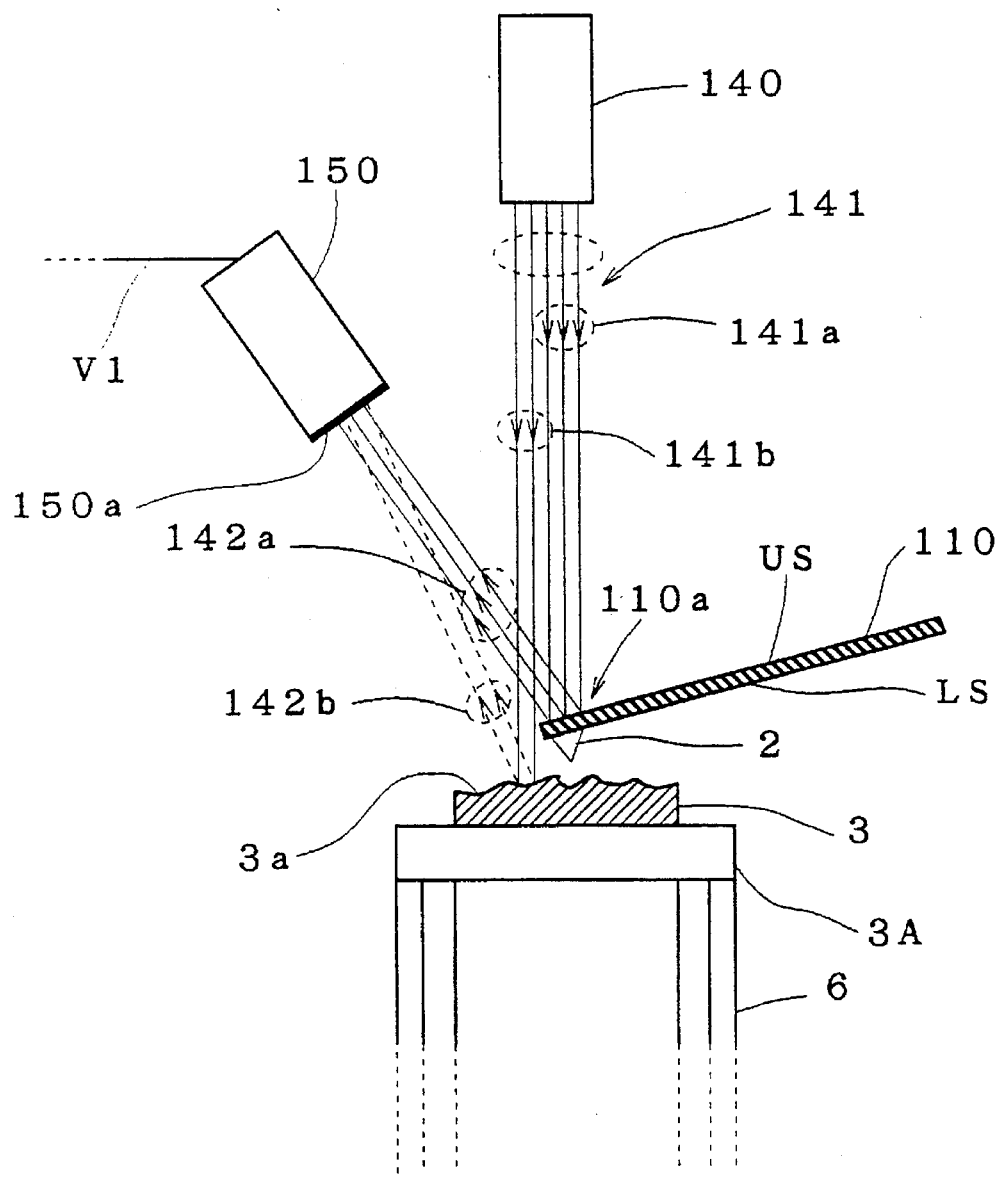
FIG. 3 is a side view of a main portion of the measuring head for illustrating the effects of the measuring head of FIG. 1.

FIG. 2 through 4 are respectively a side view of the measuring head 100 of FIG. 1, a side view of a main part of the measuring head 100, and an enlarged perspective view of the main part for illustrating the effects of this preferred embodiment.

As shown in FIG. 2 and FIG. 3, the measuring head 100 includes a light source 140 generating a parallel light beam 141 having directivity which is not linearly polarized, a cantilever body 110, a probe 2 formed on the lower main surface LS at the end of the cantilever body 110, a light position detector 150 to which an analyzing window 150a as an analyzer having an analyzing function of selecting only the reflected beam 142a of the linear polarization is attached as its incident window, and a piezo element 6 attached to a sample mount 3A on which the measured sample 3 is provided for three-dimensionally scanning the measured sample 3 in the XYZ directions.

Figure 15:
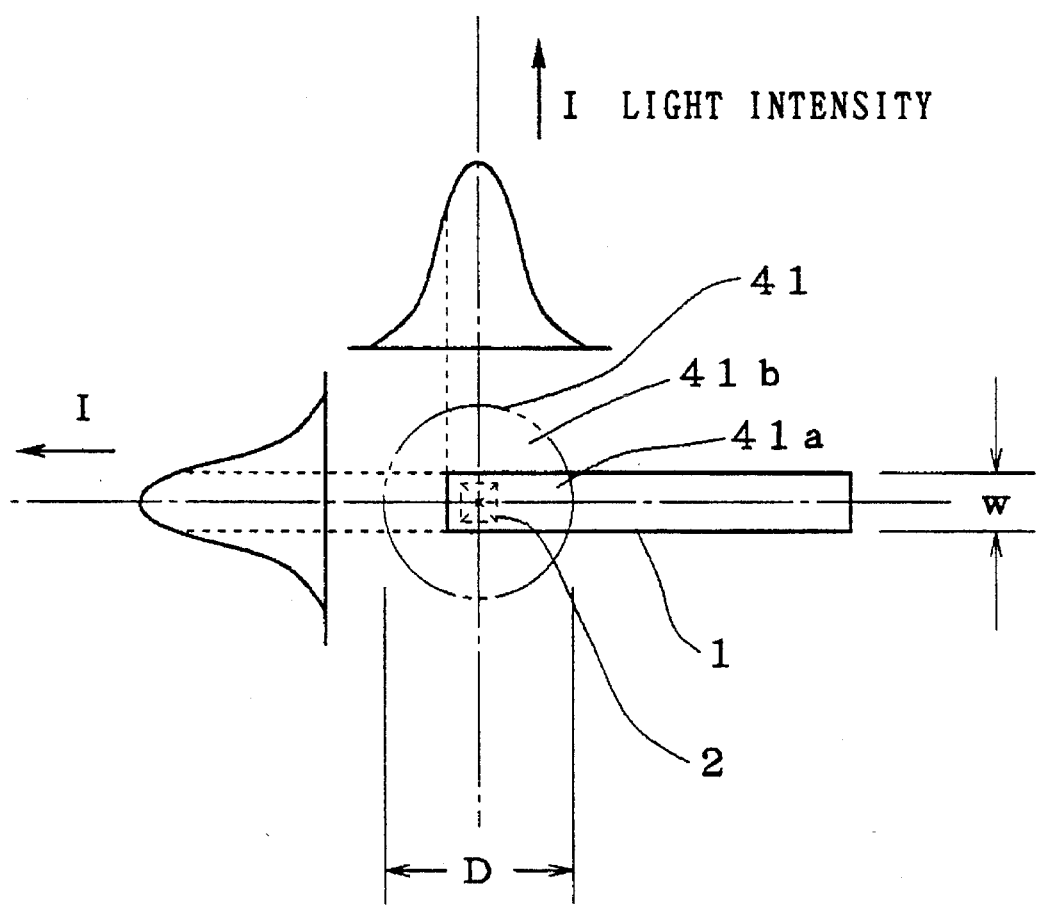
FIG. 15 is a diagram for showing the problem of the conventional measuring head.

Here, a light source including a combination of a semiconductor laser with a wavelength 670–685 nm and power 3–5 mW and a collimate lens is used as the light source 140, for example, and the minimum spot size (corresponding to D in FIG. 15) in this case is 180–190 μm. Accordingly, the light beam 141 incident upon the cantilever body 110 is an elliptically polarized light. The light beam 141 may be a circularly polarized light, and what is essential is that it is a non-linearly polarized light.

The dimensions of the cantilever body 110 differ depending on a desired spring constant and resonance frequency, and herein the width (W) is set to 18–22 μm, the thickness is set to 0.5–4 μm, and the length is set to 85–320 μm, respectively, for example.

In an upper main surface US of the cantilever body 110, the end portion 110a which is above the position where the probe 2 is disposed is the portion on which the necessary light 141a in the light beam 141 is incident. Accordingly, the light beam 141 is converged to the end 110a on the upper main surface US and irradiates the end 110a.

Here, the cantilever body 110 is set so that an incident angle θb of the light beam 141 onto the cantilever body 110 is the Brewster's angle. That is to say, a material of the cantilever body 110 and the incident angle θb made by the normal line direction of the upper main surface US of the cantilever body 110 and the ray direction of the light beam 141 are set so as to satisfy the relational expression tan(θb)=n, if the refractive index of the material of the cantilever body 110 is taken as n and the incident angle θb of the light beam 141 is the Brewslet's angle. The material includes silicon nitride, polysilicon, etc., for example. As a result, the light beam 141 or the necessary light 141a is converted into a linearly polarized light when reflected at the end portion 110a of the upper main surface US. That is to say, the reflected light beam 142 or the regularly reflected light 142a becomes so-called S polarized light component wave.

This way, by utilizing the Brewster's law, the cantilever body 110 itself serves as a polarizer or a polarizing plate having a polarizing function of converting the polarization of the incident light beam 141 into the linear polarization.

The light position detector or the position sensitive device (PSD) 150 includes a two-segment or four-segment light detecting element (a silicon photodiode, for example) inside and its incident window has an analyzing window 150a having a function as an analyzer which selects or transmits only a light having an electric vector direction corresponding to the electric vector direction of the reflected light beam 142 in the incident light. The analyzing window 150a is a window composed of a polaroid thin film, for example. As a result, the light position detector 150 detects a positional change only of the reflected light beam 142 and a light having its electric vector direction corresponding to it, which are transmitted through the analyzing window 150a and outputs its output voltage as the output signal V1.

The light position detector 150 is previously adjusted so that the electric vector direction of the light transmitted through the analyzing window 150a coincides with that of the reflected light 142.

The operation of the control portion 10 shown in FIG. 1 and the operation of measuring the unevenness image of the surface of the measured sample 3 are substantially the same as the contents described in the background art.

As shown in FIG. 4, the necessary light 141a incident upon the cantilever body 110 undergoes the polarization effect into the linearly polarized light by the upper main surface of the end portion 110a of the cantilever body 110, and the S polarized light component of the linearly polarized necessary light 141a propagates on the optical path as the regularly reflected light beam 142a and is selected by the analyzing window 150a which transmits only the same electric vector direction and is incident upon the light detecting element portion, such as a multiple-segment silicon photodiode, inside the light position detector 150, and then the output signal V1 corresponding to the detected intensity is generated.

On the other hand, the irregularly reflected light 142b originated from the extra light 141b irradiating to the surface 3a of the measured sample 3 without being incident upon the cantilever body 110, which is not linearly polarized, is almost all prevented from entering the light position detector 150 by the analyzing window 150a even if a part of it is reflected toward the light position detector 150.

Accordingly, there will be almost no error signal caused by the extra light 141b, which will cause measurement error, and it is possible to recognize that only the necessary light 141a truly necessary to obtain measured values in the Z direction causes the output signal V1 of the light position detector 150 to be generated.

As a result, the measurement in the Z direction can always be made correctly only with the regularly reflected light 142a irrespective of the interval between the cantilever body 110 and the surface 3a of the measured sample 3 and the unevenness of the surface 3a, which considerably enhances the measurement accuracy in the Z direction (up and down direction). This enables stable operation without confusing the feedback control by the control portion 10 (FIG. 1).

The measuring head 100 according to this preferred embodiment can stably and certainly observe and measure the topography of the surface even of a measured sample 3 having surface configuration which will reflect the light beam 141 reflected at the sample surface 3a, i.e., the irregularly reflected light 142b not from the cantilever body 110 toward the light position detector 150, e.g. a measured sample 3 such as a semiconductor surface having fine, complicated, and considerably uneven pattern configuration.

Figure 5:
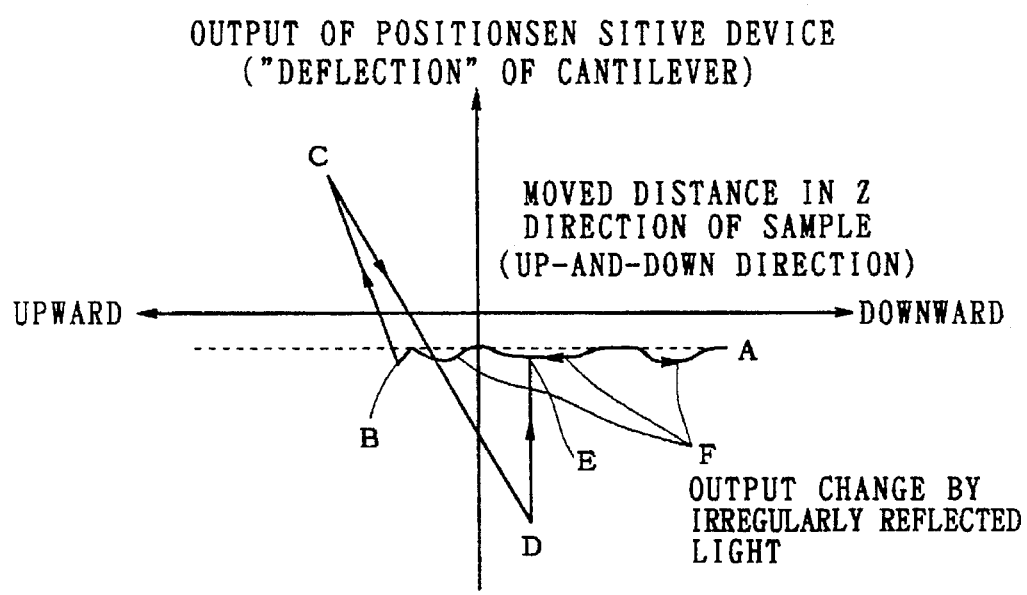
FIG. 5 is a diagram showing a conventional force curve for illustrating the effects of the present invention.
Figure 6:
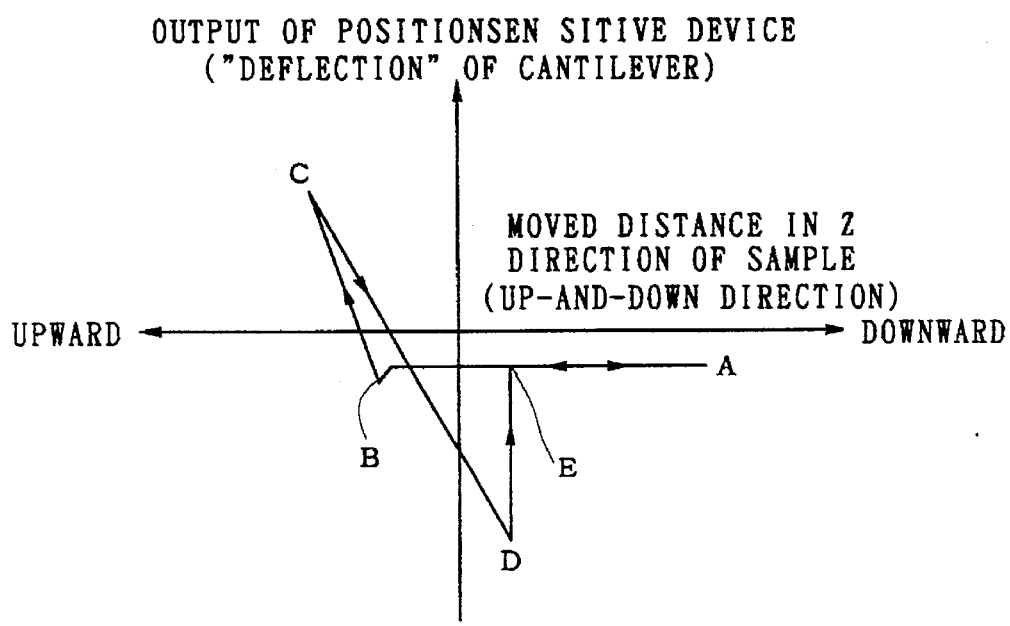
FIG. 6 is a diagram showing a force curve for illustrating the effects of the present invention.

FIG. 5 and FIG. 6 respectively show force curves in the conventional case and in this preferred embodiment to illustrate the effects of this preferred embodiment. In each force curve, the axis of abscissas shows a moved distance in the Z direction (up and down direction) of the measured sample 3 of FIG. 2 and the axis of ordinates shows the output of the light position detector 5 or 150 (i.e., "deflection" of the cantilever body 1, 110). The upward direction of the axis of abscissas is the direction in which the measured sample 3 is moved toward the tip of the probe 2 by the piezo element 6 of FIG. 2, and the downward direction of the axis of abscissas is the direction in which the measured sample 3 is moved away from the probe 2. Now, referring to FIG. 2, the loci of the force curves shown in FIG. 5 and FIG. 6 will be described.

First, the measured sample 3 is brought close to the probe 2 and a triangular wave voltage is applied to the piezo element 6 from the controller 7, and the measured sample 3 is moved up and down in the Z direction. The amount of "deflection" of the cantilever body 1 or 110 corresponding to the amount of displacement of the measured sample 3 in the Z direction is read from the output voltage value of the light position detector 5 or 150. The dependency of the output voltage of the light position detector 5, 150 (deflection) on the voltage applied to the piezo element (the moved distance in the Z direction) is graphed to obtain the force curves.

Referring to the points A–E shown in FIG. 5 and FIG. 6, the force curve must originally vary as follows. That is to say, as the measured sample 3 is moved upward from the point A where an initial certain force is applied, i.e., as the measured sample 3 is brought closer to the tip of the probe 2, the output of the light position detector slightly decreases immediately before the point B where the measured sample 3 and the probe 2 get in contact with each other, because of the van der Waals force. Then, after it passes the point B, the interatomic repulsion force acts and the output of the light position detector thus linearly increases to reach its maximum when reaching the point C which corresponds to the maximum value of the triangular wave voltage applied to the piezo element 6. Then, when the measured sample 3 is moved downward, i.e., when the measured sample 3 is gradually brought away from the probe 2, an adhesive force acts between the measured sample 3 and the probe 2, and then the output of the light position detector linearly decreases with a gradient smaller than that from the point B to the point C. This decrease continues until the measured sample 3 reaches the point D where the interval between the measured sample 3 and the probe 2 becomes larger than that at the point B. Then after it reaches the point D, the "deflection" of the cantilever 1, 110 returns to reach the point E against the adhesive force. Subsequently, the output of the light position detector is constant until the measured sample 3 returns to the point A which corresponds to the minimum value of the applied triangular wave voltage.

Figure 12:
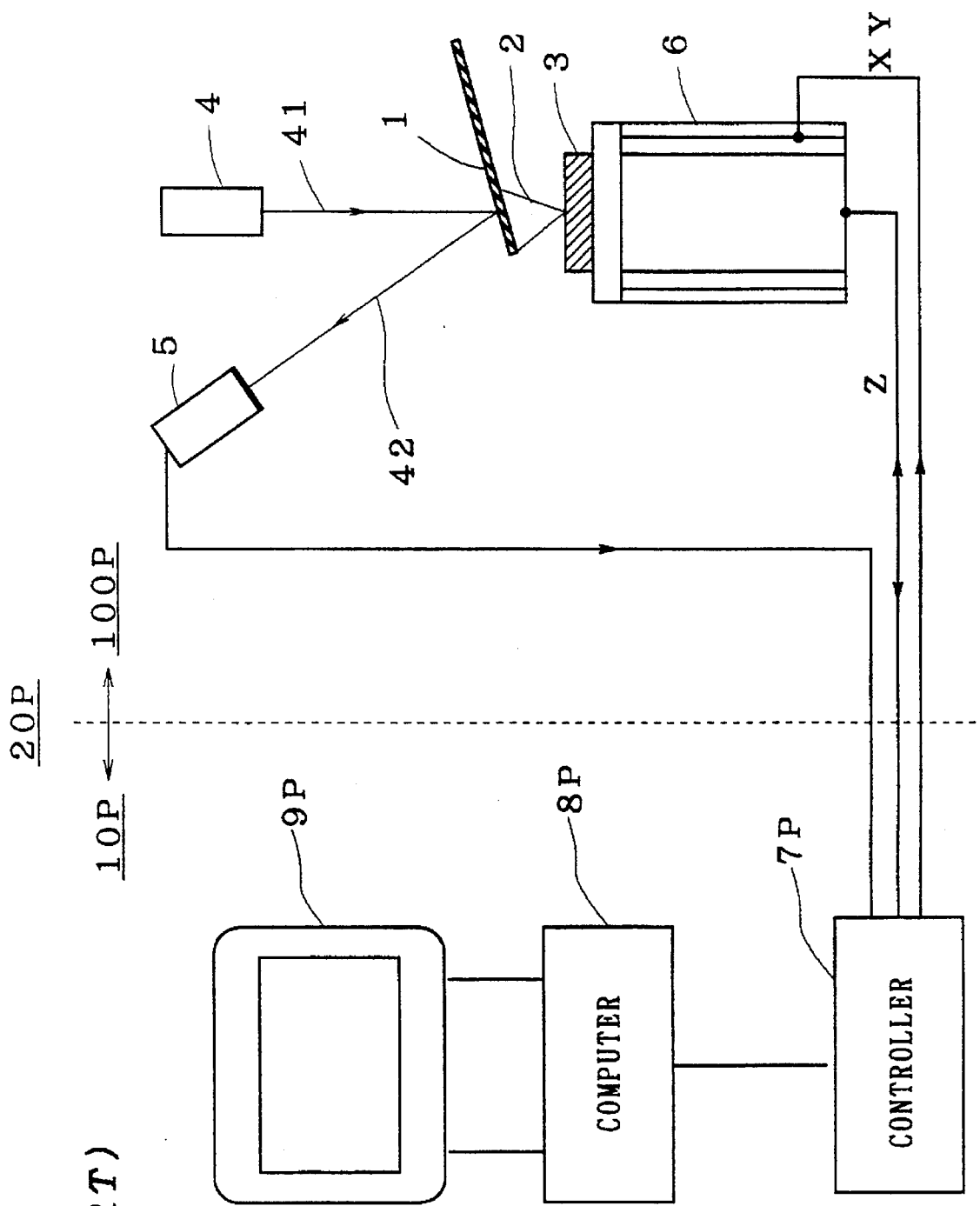
FIG. 12 is a block diagram showing the structure of a conventional atomic force microscope.
Figure 13:
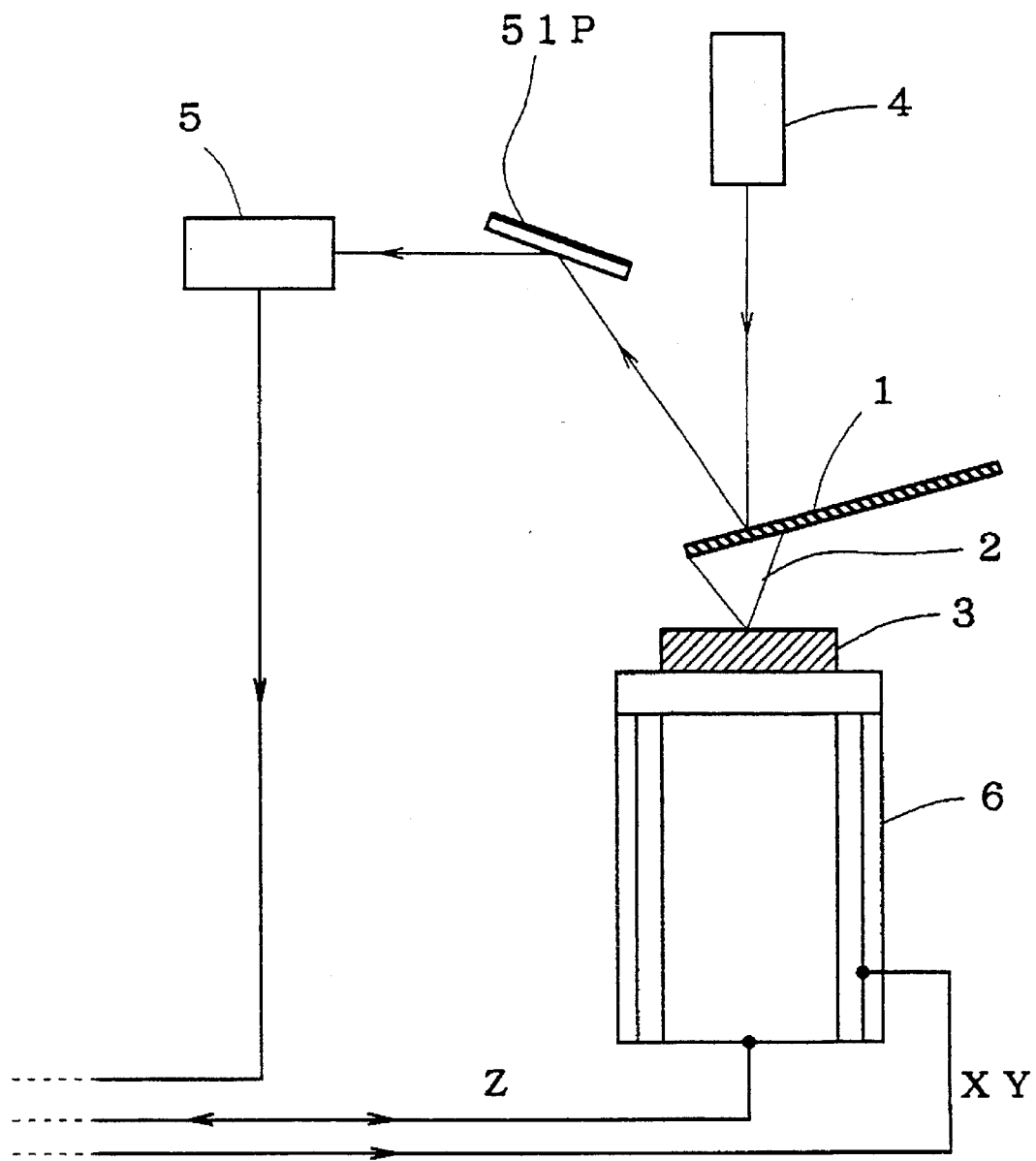
FIG. 13 is a diagram showing the structure of the conventional measuring head.
Figure 14:
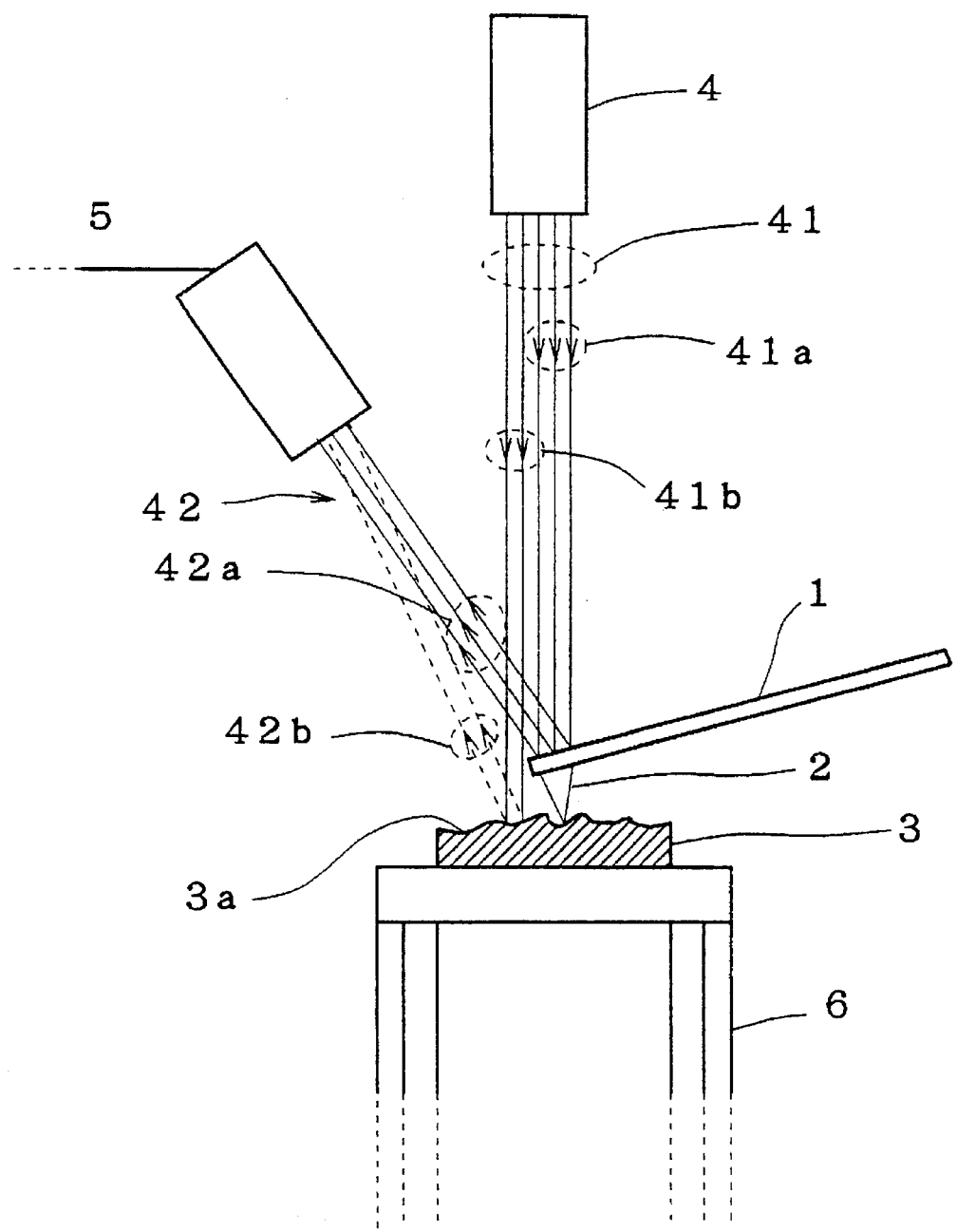
FIG. 14 is a diagram showing the problem of the conventional measuring head.

In the conventional force curve shown in FIG. 5, however, as the measured sample 3 is moved upward from the point A, i.e., as the measured sample is brought closer to the probe 2, the irregularly reflected light 42b penetrates into the light position detector 5, as shown in FIG. 14, depending on the interval between the cantilever body 1 and the surface 3a of the measured sample 3 and the unevenness of the surface 3a, and therefore "swellings" are caused as shown by the curve F in FIG. 5. That is to say, the irregularly reflected light 42b has bad influence even when the measured sample 3 has not got in contact with the probe 2 yet. This is not solved even if the measured sample 3 is scanned in the XYZ directions while feedback controlling the measuring head 100P of FIG. 12 between the point B and the point C where the measured sample 3 and the probe 2 are in contact, because the irregularly reflected light 42b originated from the extra light 41b (FIG. 14) penetrates into the light position detector 5 depending on the XY scanning point. Accordingly, the measuring accuracy is decreased in the Z direction.

In the force curve of this preferred embodiment, as shown in FIG. 6, the analyzing window 150a prevents the irregularly reflected light 142b from penetrating into the light position detector 150, and therefore no "swellings" as shown in FIG. 5 are caused at all. Accordingly, the original force curve described above is realized.

Polysilicon or silicon nitride with an Au thin film vacuum evaporated on its surface may be used as the cantilever body 110 to increase the reflectivity, for example.

(Second Preferred Embodiment)

Figure 7:
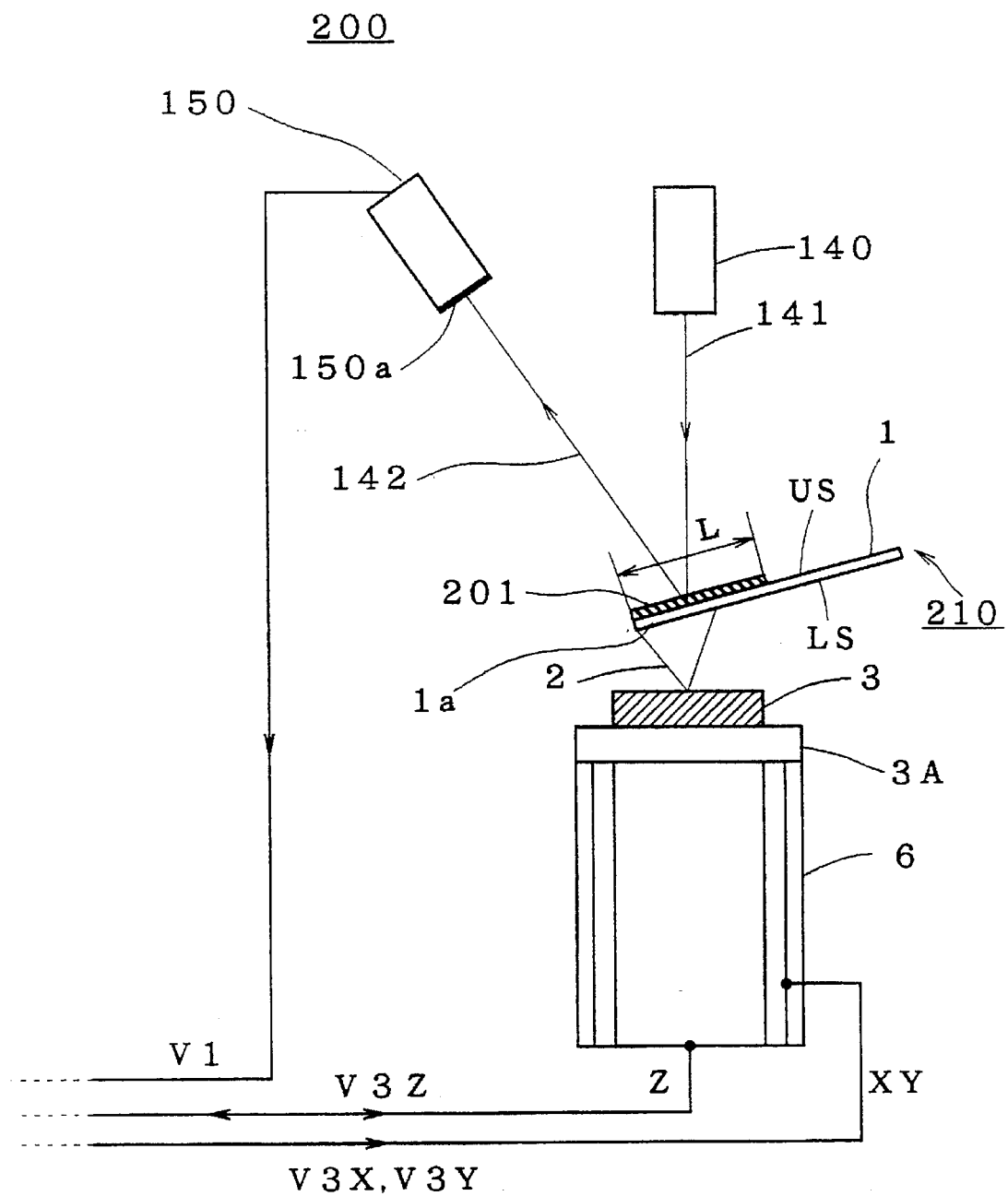
FIG. 7 is a side view showing the structure of a measuring head in a second preferred embodiment of the present invention.

FIG. 7 is a side view of a measuring head 200 in a second preferred embodiment of the present invention. In the figure, a cantilever (cantilever means) 210 of the measuring head 200 includes a cantilever body 1 which causes no linearly polarized light and a polarizing film 201, such as a polaroid thin film, for example, formed in a partial region at least including the end portion 1a which is above the position where the probe 2 is provided (which is the region from one end of the cantilever body 1 to the position separated from it by the length L in the elongate direction, which has an area of LW) in the upper main surface US of the cantilever body 1. The end portion 1a is the region where the light beam 141 is incident upon. Other components are the same as those in the first preferred embodiment.

Accordingly, the light beam 141 is incident at the Brewster's angle with respect to the normal line direction of the upper main surface of the polarizing film 201, subject to the polarization effect, and is reflected as the linearly polarized reflected light 142 (S polarized light component).

This way, in the second preferred embodiment in which the polarizing film 201 is just formed in a partial area on the conventional cantilever body 1 using the vacuum evaporation method etc., the cantilever or the cantilever means can be fabricated more easily than the first preferred embodiment. Furthermore, it has the advantage that the cantilever body 1 available on the market can be utilized, which advantage provides the practical cantilever means with its easy fabrication stated above.

Moreover, since the polarizing film 201 is provided only in a necessary portion which is to be irradiated with the light beam 141 or the necessary light 141a (the length L can be set short), as stated above, light reflected at the extra portion in the upper main surface US of the cantilever body 1 is not converted into the linearly polarized light, which removes unnecessary reflected light produced on the upper main surface of the cantilever body 1 outside of the end portion, enhancing the measurement accuracy more. This is far more advantageous than the above-cited reference (11) which tries to achieve the same effect because the structure can be simple in this second preferred embodiment.

(Third Preferred Embodiment)

A third preferred embodiment also intends to obtain the effect the same as that of the first preferred embodiment and particular effect by using the conventional cantilever body 1, similarly to the second preferred embodiment.

Figure 8:
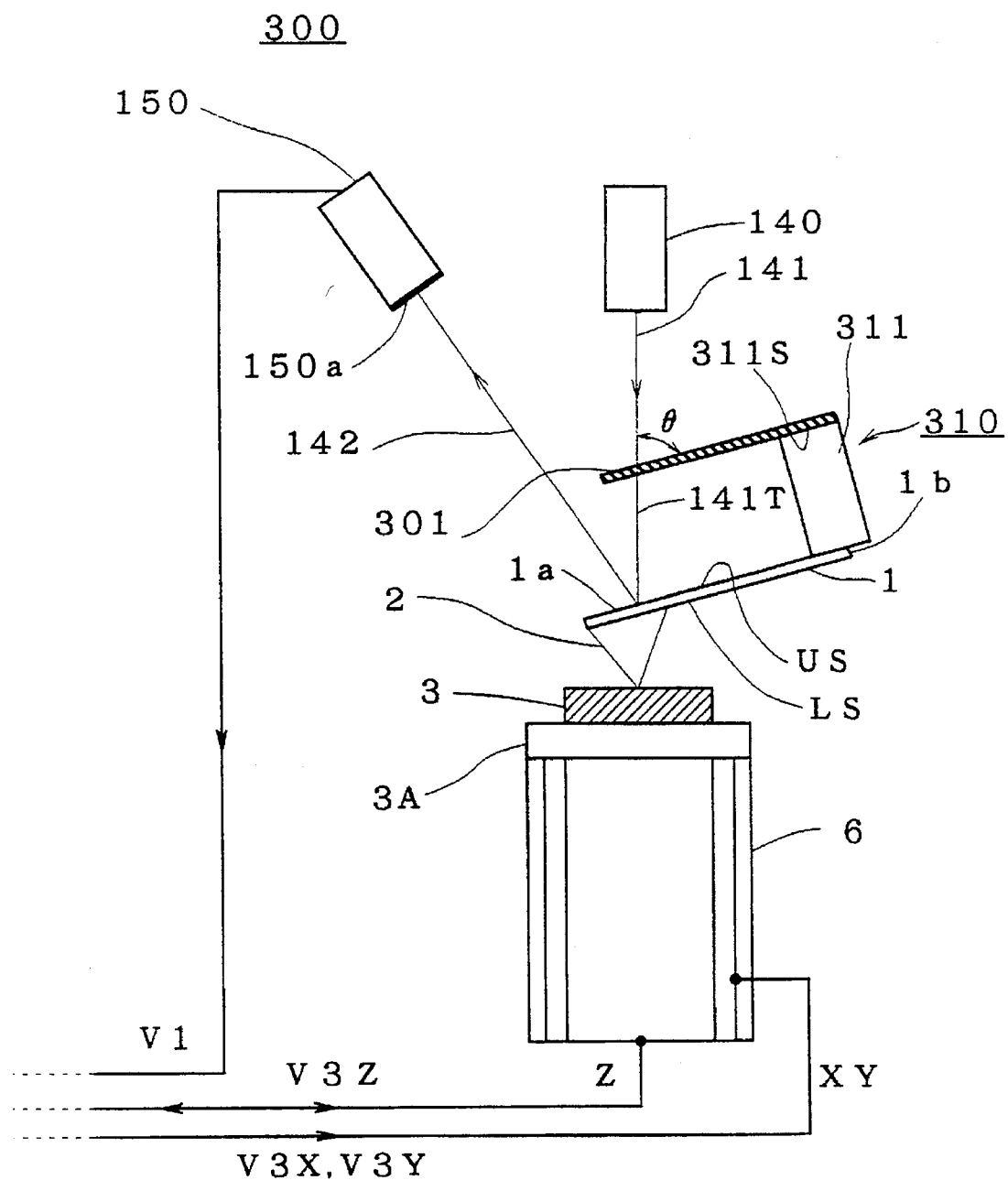
FIG. 8 is a side view showing the structure of a measuring head in a third preferred embodiment of the present invention.
Figure 9:
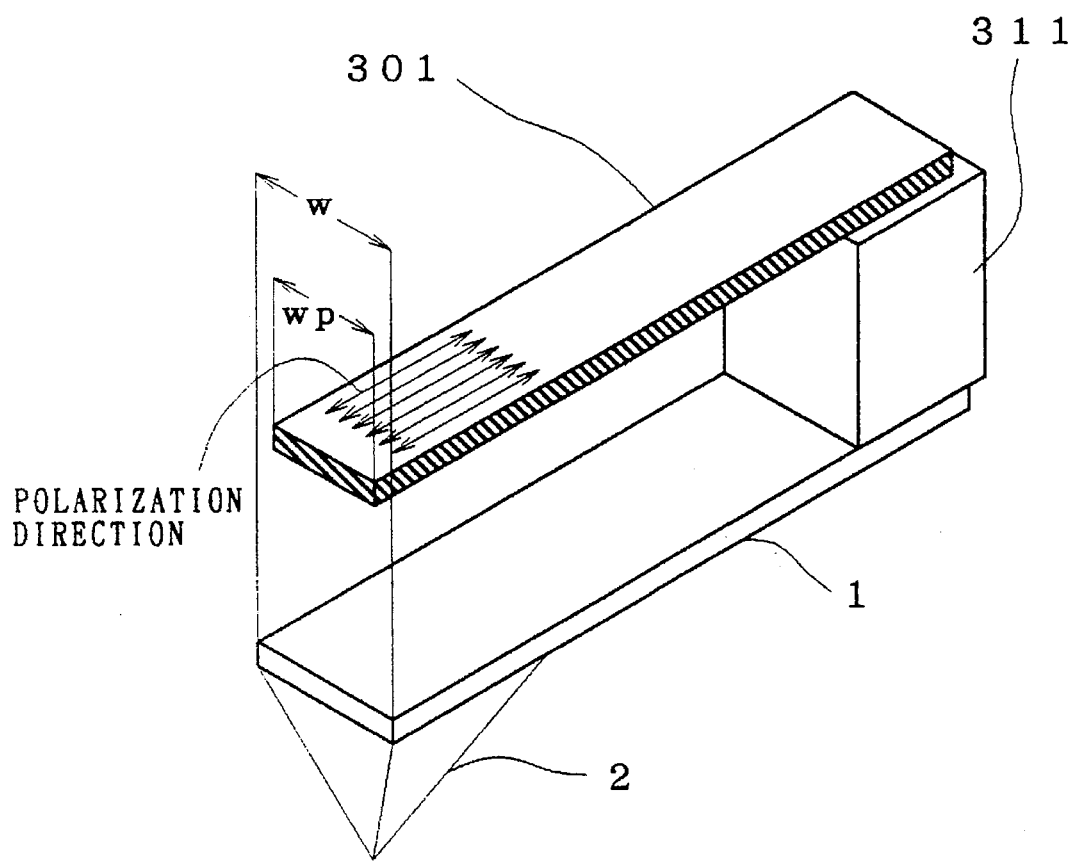
FIG. 9 is an enlarged perspective view of the cantilever of FIG. 8.

FIG. 8 and FIG. 9 are a side view of a measuring head 300 in the third preferred embodiment and an enlarged perspective view of a cantilever (cantilever means) 310. Now, the cantilever means 310 of the measuring head 300 includes a cantilever body 1 which causes no linearly polarized light, a spacer 311 mechanically fixed on the upper main surface US on its other end side 1b, and a polarizing plate 301 having a polaroid thin film as its polarizing material, for example, and having its other end of the lower main surface fixed to a surface 311S of the spacer 311 which is almost parallel to the upper main surface US. The incident angle formed between a normal line direction of an upper main surface of the polarizing plate 301 and the light beam 141 is set to the Brewster's angle. Accordingly, the polarized light plate 301 has a polarizing action of linearly polarizing (p polarization light component) the transmitted light 141T of the light beam 141 incident upon its upper main surface.

The polarizing plate 301 has its width wp smaller than the width w of the cantilever body 1 as shown in FIG. 9, and is provided almost parallel with respect to the cantilever body 1 so that its entirety is included in the upper main surface US of the cantilever body 1 when the upper main surface US of the cantilever body 1 is seen from the light source 140 side not to allow its transmitted light to get off the upper main surface US of the cantilever body 1. (It is essential that it is included inside it, but it does not necessarily have to be parallel.) Accordingly, part of the light beam 141 emitted from the light source 140, which is not linearly polarized, incident upon the upper main surface of the polarizing plate 301 becomes a linearly polarized light after passing through the polarizing plate 301, and all the transmitted light beam 141T is reflected at the upper main surface US of the cantilever body 1 having no polarizing property. At this time, only the reflected light beam 142 which is produced from the transmitted light beam 141T is the linearly polarized light. In this sense, it can be said that the cantilever means 310 has a polarizing function of converting the polarization of the light beam 141 into the linear polarization. Then, only the reflected light beam 142 is detected by the light position detector 150 having the analyzing window 150a having an analyzing function for selecting and transmitting only the reflected light beam 142 of linear polarization. This point is the same as the first and second preferred embodiments.

Particularly in this third preferred embodiment, in addition to the advantage that the conventional cantilever body 1 on the market can be appropriated, the angle θ formed between the light beam 141 and the polarizing plate 301 can always be a constant value (the Brewster's angle) because the polarizing plate 301 itself is not deflected even if the cantilever body 1 is deflected. Thus, a polarizing plate having dependency on the incident angle of light can be used as the polarizing plate 301.

The above-cited reference (11) Japanese Patent Laying-Open No. 4-285810 and the reference (12) Japanese Patent Laying-Open No. 7-5181 disclose the conventional art for preventing the light reflected in an area in the upper main surface of the cantilever body 1 off the end portion from reaching the light position detector, but the former only describes provision of a step structure in a part of the upper main surface of the cantilever body 1, and the latter describes to polarize all the light beam traveling to the cantilever body 1, and none of which can prevent the irregularly reflected light reflected from the measured sample surface from reaching the light position detector. Accordingly, in the application to a very uneven measured sample surface, the conventional arts shown in the above-cited references (11) and (12) have a problem that the measurement accuracy considerably decreases and the feedback operation becomes unstable.

On the other hand, in the present invention, in any of the preferred embodiments, only part of the light beam 141, i.e., only the necessary light 141a incident only on the end portion of the upper main surface of the cantilever body 1 is converted into a linearly polarized light, and the remaining light beam 141, i.e., the unnecessary light 141b remains a non-linearly polarized light.

(Fourth Preferred Embodiment)

Figure 10:
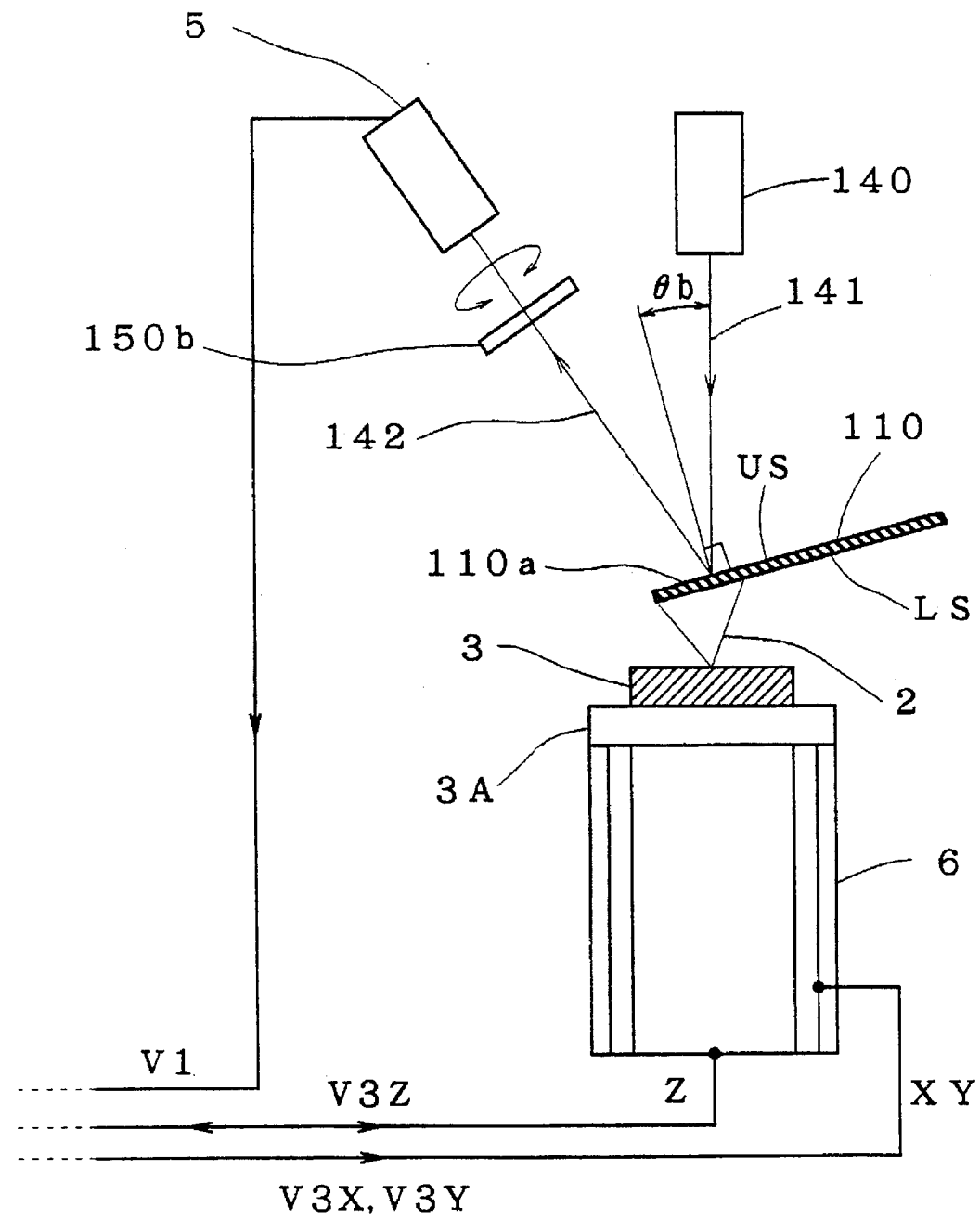
FIG. 10 is a side view showing the structure of a measuring head in a fourth preferred embodiment of the present invention.

FIG. 10 is a side view of a measuring head 400 in a fourth preferred embodiment of the present invention. The measuring head 400 in this fourth preferred embodiment is different from the first through third preferred embodiments in the structure of the light position detecting means. Accordingly, any of the cantilever means described in the first through third preferred embodiments may be used, and an example is shown here for convenience in which the cantilever means (110) described in the first preferred embodiment is used.

It is characterized in that a transmissive analyzing plate 150b capable of rotation about the incident direction of the reflected light beam 142 as a rotation axis and having an analyzing function of selecting and transmitting only the reflected light beam 142 of the linearly polarized light is provided on the incident optical path side of the light position detector 5 having no analyzing window. This analyzing plate 150b has a polaroid thin film as its analyzing material, for example.

According to this measuring head 400, even if the direction of the electric vector of the reflected light beam 142 reflected at the cantilever body 110 having its upper main surface US producing a reflected light of linear polarization is twisted in a certain direction, the analyzing plate 150b is previously rotated to coincide with the direction of the electric vector to enable fine adjustment. This rotating adjustment is achieved by manual adjustment while observing the output signal V1, or by automatic adjustment with a motor attached to the analyzing plate 150b. Thus, only the regularly reflected light 142a can be certainly selected and the regularly reflected light 142a can be introduced into the light position detector 5. Accordingly, the measurement accuracy can be increased by using a common light position detector having no analyzing window.

(Fifth Preferred Embodiment)

This embodiment is also characterized by the light position detecting means, in which any of the cantilever means in the first through third preferred embodiments can be used, and the cantilever body 110 is used here for convenience.

Figure 11:
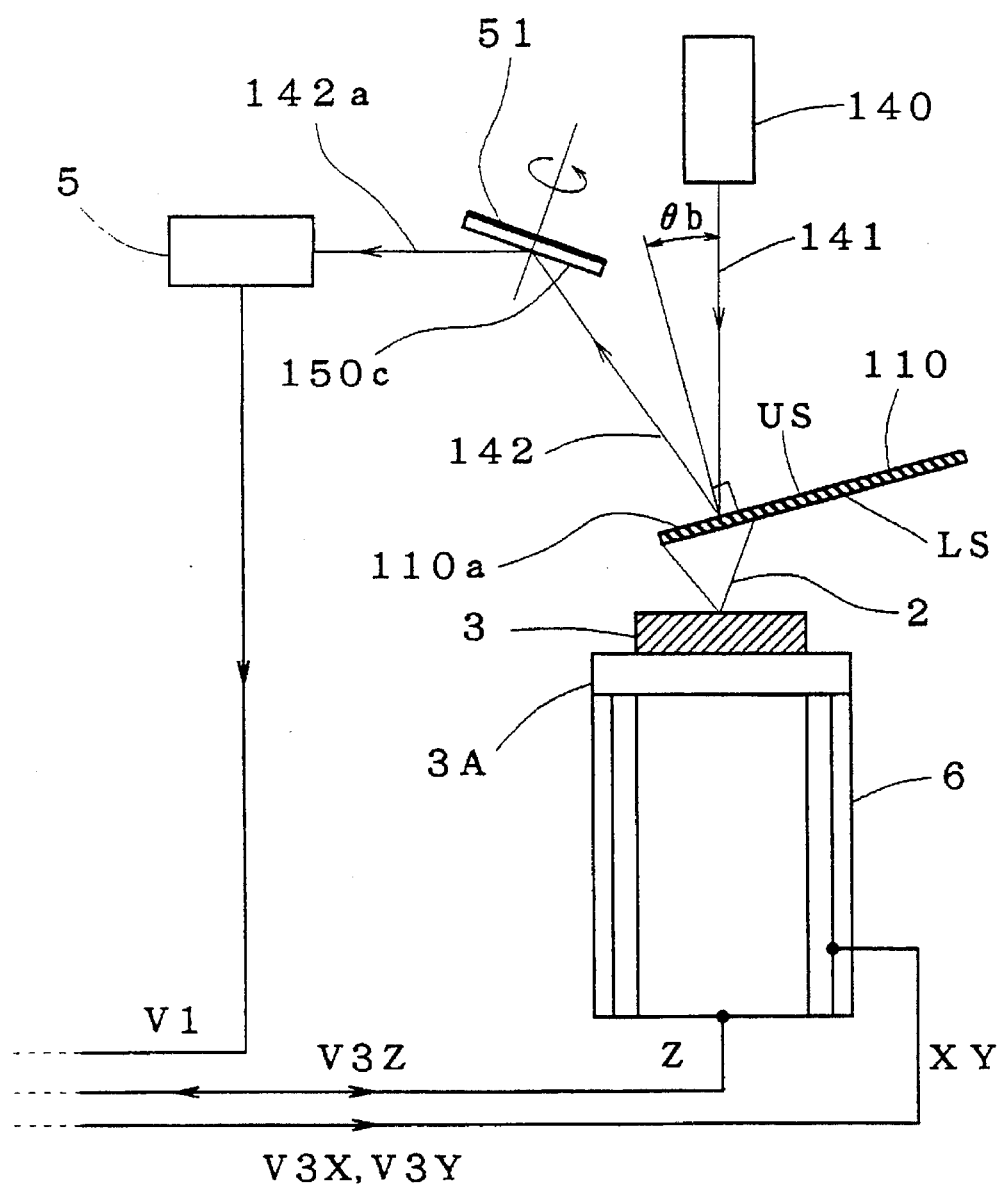
FIG. 11 is a side view showing the structure of a measuring head in a fifth preferred embodiment of the present invention.

FIG. 11 is a side view of a measuring head 500 in a fifth preferred embodiment of the present invention. This measuring head 500 is characterized in that a mirror 51 is provided in the optical path of the reflected light beam 142 between the cantilever body 110 having its upper main surface US producing a reflected light of linear polarization and the light position detector 5 having no analyzing window, i.e., on the incident optical path side of the light position detector 5.

An analyzing film 150c (art analyzer) having an analyzing function of reflecting (or selecting) only the regularly reflected light 142a which is linearly polarized, and having a polaroid thin film as its analyzing detecting material, for example, is formed on a surface of the mirror 51 which the reflected light beam 142 is incident upon, i.e., on its reflecting surface. Accordingly, only the regularly reflected light 142a is surely selected through this mirror 51 and introduced into the light position detector 5. Furthermore, while maintaining the optical path direction of the regularly reflected light 142a toward the light position detector 5, the mirror 51 can be rotated about its normal line direction as a rotation axis. This way, as the mirror 51 is set rotatable, the mirror 51 can be arranged to have its analyzing surface agree with the electric vector direction of the regularly reflected light 142a through the rotating fine adjustment, in the same way as the polarizing plate 150 described in the fourth preferred embodiment, and then the irregularly reflected light 142b can certainly be prevented from entering the light position detector 5. This way, according to the fifth preferred embodiment, the measurement accuracy can be enhanced by using the common light position detector 5 having no analyzing window.

(Summary)

The relation between the "cantilever means" and the "light position detecting means" in the first through fifth preferred embodiments is shown in Table 1.

TABLE 1

| Preferred Embodiment No. | Cantilever Means | Light Position Detecting Means |
|---|---|---|
| 1 | Cantilever body 110 | Light position detector 150 + Analyzing window 150a |
| 2 | Cantilever body 1 Polarizing film 201 | The same as above |
| 3 | Cantilever body 1 Spacer 311 Polarizing plate 301 | The same as above |
| 4 | Any of No.1–No.3 | Analyzing plate 150b Light position detector 5 |
| 5 | Any of No.1–No.3 | Mirror 51 + Analyzing film 150c Light position detector 5 |

(Effects of the Preferred Embodiments)

(1) As has been described hereinabove, in the first preferred embodiment, the measuring head 100 includes the light source 140 for generating a light beam 141 which is not linearly polarized, the cantilever body 110 onto which end portion of the upper surface 110a the light beam 141 is converged and radiated and having a polarizing function of producing the reflected light beam 142 of linear polarization in the part 110a, the probe 2 formed on the main surface of the end portion of the cantilever body 110, the light position detector 5 having the analyzing window 150a having an analyzing function of selecting only the reflected light 142 of linear polarization, and the piezo element 6. Accordingly, since only the necessary light 141a truly necessary to obtain measured values in the Z direction causes the light position detector 150 to produce the output signal V1, and there is almost no error signal resulted from the unnecessary extra light 141b causing measuring errors, measurement in the Z direction can correctly be achieved with the regularly reflected light 142a, irrespective of the interval between the cantilever body 1 and the surface 3a of the measured sample 3 and the unevenness of the surface 3a, and the feedback control by the control portion 10 can be made stably without being confused. It is a matter of cause that it has the advantage that the light beam 141 can easily be applied to the end portion 110a of the cantilever body 110 because the beam diameter of the light beam at the irradiated position is set to a practical value which can be visually recognized.

(2) In the second preferred embodiment which adopts the structure in which the polarizing film 201 is locally formed only in an area including the end portion 1a on which the light beam 141 is incident in the upper main surface of the cantilever body 1 causing no linear polarization, the conventional cantilever body 1 available on the market can be used and it can be improved to thereby realize the effect discussed in the first preferred embodiment.

Moreover, it is sufficient only to locally form the polarizing film 201 on the upper main surface of the cantilever body 1, so that the cantilever means can easily be fabricated.

In addition, as the light incident on and reflected at the upper main surface US except the end portion 1a is mostly reflected at the portion where the polarization film 201 is not formed, it does not become a linearly polarized light. Accordingly, such unnecessary reflected light is prevented from entering the light position detector 150, enhancing the accuracy more with its simple structure.

(3) The third preferred embodiment in which the cantilever means 310 of the measuring head 300 includes the cantilever body 1 causing no linear polarization and the polarizing plate 301 attached in the incident optical path side toward the cantilever body 1 through the spacer 311 has the advantage that the conventional cantilever body 1 can be appropriated, as well as the same effects as those of the first preferred embodiment, and it further has the effect that the polarizing plate 301 having dependency upon the light incident angle can be used as a polarizing plate because the angle θ formed between the light beam 141 and the polarizing plate 301 is always constant.

(4) In the fourth preferred embodiment, as the measuring head 400 has the structure in which the rotary analyzing plate 150b is provided on the incident optical path side of the light position detector 5 having no analyzing window, even ff the direction of the electric vector of the reflected light 142 is twisted, the analyzing plate 150b can be rotated to the direction of the electric vector, and only the regularly reflected light 142a can certainly be selected or transmitted through such rotating fine adjustment to be introduced into the light position detector 5. Accordingly, only the light of the linear polarization reflected at the end portion can be detected using the conventionally used common light position detector 5, producing the effect of considerably increasing the measurement accuracy as an atomic force microscope.

In addition, in this fourth. preferred embodiment, the light position detecting means which is made as one body in the first through third preferred embodiments is separated into the light position detector 5 and the rotatable analyzing plate 150b, so that adjustment is made twice by the two, 150b and 150, and more correct fine adjustment can be achieved.

(5) In the fifth preferred embodiment, the measuring head 500 has the mirror 51 having the analyzing film 150c as its reflecting surface provided in the optical path of the reflected light beam 142 between the cantilever body 110 having a polarizing function of converting the incident light beam of non-linear polarization into a linearly polarized light and the light position detector 5. This enables only the regularly reflected light beam 142a to be certainly selected through the mirror 51 to be introduced into the light position detector 5, and only the regularly reflected light beam 142a as a linear polarized light can be detected by using the common light position detector which is conventionally used, producing the effect of considerably increasing the measurement accuracy. In this case, the mirror 51 functions as a detecting means itself for the light of the linear polarization.

In addition, as the mirror 51 is capable of free rotation, the preliminary adjustment for making the detecting direction on the light position detector side coincide with the oscillation direction of the electric vector of the regularly reflected light beam 142a can be made with rotation of the mirror 51. This enables fine adjustment and realizes very accurate adjustment.

In addition, since the mirror 51 can change the optical path of the regularly reflected light beam 142a, it can be made compact in layout. That is to say, the present invention can enjoy the effects of the conventional art, too.

While the invention has been described in detail, the foregoing description is in all aspects illustrative and not restrictive. It is understood that numerous other modifications and variations can be devised without departing from the scope of the invention.

We claim:

1. A measuring head of an atomic force microscope, comprising:

a light source for generating a light beam of non-linear polarization; cantilever means comprising a cantilever body having a probe provided on its lower main surface facing to a measured sample, for reflecting part of said light beam incident from said light source at an end portion on an upper main surface of said cantilever body which is above a position where said probe is provided, and having a polarizing function of changing polarization of said light beam into linear polarization at that time; and light position detecting means for detecting a positional change only of a reflected light beam of said linear polarization.

2. The measuring head of an atomic force microscope according to claim 1, wherein said cantilever body itself consists essentially of a polarizer having said polarizing function.

3. The measuring head of an atomic force microscope according to claim 2, wherein said polarizer is formed of a polarizing plate set so that an incident angle of said light beam incident from said light source is a Brewster's angle.

4. The measuring head of an atomic force microscope according to claim 1, wherein said cantilever means further comprises a polarizing film formed on said upper main surface of said cantilever body for producing said polarizing function to said light beam incident from said light source.

5. The measuring head of an atomic force microscope according to claim 4, wherein said polarizing film is formed in a partial area in said upper main surface including at least said end portion.

6. The measuring head of an atomic force microscope according to claim 4, wherein said polarizing film and said cantilever body are set so that an incident angle of said light beam incident from said light source is a Brewster's angle.

7. The measuring head of an atomic force microscope according to claim 1, wherein said cantilever means further comprises a polarizing plate having a width smaller than a width of said cantilever body, provided on an incident side of said light beam to be included in said upper main surface of said cantilever body when said cantilever body is seen from said light source side, for transmitting said light beam incident from said light source toward said cantilever body as said linearly polarized light.

8. The measuring head of an atomic force microscope according to claim 7, wherein said polarizing plate is set so that an incident angle of said light beam incident from said light source is a Brewster's angle.

9. The measuring head of an atomic force microscope according to claim 1, wherein said light position detecting means comprises:

an analyzer having an analyzing function for selecting only light having an electric vector direction which coincides with an electric vector direction of said linearly polarized reflected light beam, and a light position detector for detecting a positional change of light selected by said analyzer.

10. The measuring head of an atomic force microscope according to claim 9, wherein said analyzer transmits only said light having said electric vector direction which coincides with said electric vector direction of said linearly polarized reflected light beam in its incident light as said light detecting function, and said light position detector detects said positional change of said light transmitted through said analyzer.

11. The measuring head of an atomic force microscope according to claim 10, wherein said analyzer is attached to said light position detector as an analyzing window of said light position detector.

12. The measuring head of an atomic force microscope according to claim 11, wherein said analyzing window is a window consisting essentially of a polaroid thin film as a material.

13. The measuring head of an atomic force microscope according to claim 10, wherein said analyzer is an analyzing plate provided on an incident optical path side of said light position detector and consisting essentially of a material having said analyzing function as its analyzing material.

14. The measuring head of an atomic force microscope according to claim 13, wherein said analyzing plate is set rotatable about an incident direction of said linearly polarized reflected light beam as a rotation axis.

15. The measuring head of an atomic force microscope according to claim 14, wherein said analyzing material of said analyzing plate is a polaroid thin film.

16. The measuring head of an atomic force microscope according to claim 9, wherein said analyzer is a mirror provided on an incident optical path side of said light position detector for reflecting only said light having said electric vector direction which coincides with said electric vector direction of said linearly polarized reflected light beam in its incident optical path toward said light position detector.

17. The measuring head of an atomic force microscope according to claim 16, wherein said mirror is set rotatable about its normal line direction as a rotation axis.

18. The measuring head of an atomic force microscope according to claim 17, wherein an analyzing film having said analyzing function is formed on a reflecting surface of said mirror.

19. The measuring head of an atomic force microscope according to claim 18, wherein said analyzing film consists essentially of a polaroid thin film as its material.

20. An atomic force microscope, comprising:

a measuring head;

a measured sample; and a control portion for controlling said measuring head;

said measuring head comprising:

driving means for three-dimensionally scanning said measured sample, a light source for generating a light beam of non-linear polarization, cantilever means having a probe for sensing unevenness on a surface of said measured sample, for reflecting part of said light beam incident on an upper main surface end portion to change polarization of the reflected light beam into linear polarization, said probe formed on a lower main surface end portion facing to said upper main surface end portion, and light position detecting means for detecting a positional change only of said reflected light beam of said linear polarization, wherein said control portion outputs a control signal for controlling said driving means according to an output signal of said light position detecting means, and said driving means scans said measured sample according to said control signal.

* * * * *